(12) United States Patent  (10) Patent No.: US 9,313,613 B2
Lee et al.  (45) Date of Patent: Apr. 12, 2016

(54) METHOD, APPARATUS, AND SYSTEM FOR PERFORMING UNSOLICITED LOCATION-BASED DOWNLOAD

(71) Applicant: LG ELECTRONICS INC., Seoul (KR)

(72) Inventors: Minsoo Lee, Seoul (KR); Kyungho Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/380,526

(22) PCT Filed: Feb. 25, 2013

(86) PCT No.: PCT/KR2013/001481
§ 371 (c)(1),
(2) Date: Aug. 22, 2014

(87) PCT Pub. No.: WO2013/125920
PCT Pub. Date: Aug. 29, 2013

(65) Prior Publication Data
US 2015/0065174 A1    Mar. 5, 2015

Related U.S. Application Data

(60) Provisional application No. 61/602,598, filed on Feb. 24, 2012.

(51) Int. Cl.
*H04W 24/00* (2009.01)
*H04W 4/02* (2009.01)
(Continued)

(52) U.S. Cl.
CPC .............. *H04W 4/02* (2013.01); *H04L 67/18* (2013.01); *H04W 4/028* (2013.01); *H04W 64/00* (2013.01); *H04L 67/06* (2013.01)

(58) Field of Classification Search
CPC ....... H04W 4/02; H04W 64/00; H04W 4/028; H04L 67/18; H04L 67/06
USPC ....................................... 455/456.3
See application file for complete search history.

(56) References Cited

U.S. PATENT DOCUMENTS

2004/0128066 A1    7/2004  Kudo et al.
2007/0049289 A1    3/2007  Woo
(Continued)

FOREIGN PATENT DOCUMENTS

JP    2004-30360 A    1/2004
JP    2007-81714 A    3/2007
(Continued)

*Primary Examiner* — Juan A Torres
(74) *Attorney, Agent, or Firm* — Birch, Stewart, Kolasch & Birch, LLP

(57) ABSTRACT

A method for unsolicited location-based downloading, and an apparatus and a system therefore are discussed. The method according to one embodiment includes setting a location report interval for updating information about a location of a client device; updating the location information based on the location report interval; reporting the updated location information; receiving a predicted location and predicted period of the client device and a source universal resource identifier (URI) for downloading content before the client device reaches the predicted location; sending a request for the content corresponding to the source URI when the client device reaches the predicted location. The request is to request downloading of the content in a set format and is generated by any one of the server and the client device. The method according to the embodiment further includes downloading the content; and assigning a priority to each of the predicted locations.

18 Claims, 13 Drawing Sheets

(51) Int. Cl.
*H04L 29/08* (2006.01)
*H04W 64/00* (2009.01)

(56) References Cited

U.S. PATENT DOCUMENTS

| | | |
|---|---|---|
| 2007/0219708 A1 | 9/2007 | Brasche et al. |
| 2007/0296574 A1 | 12/2007 | Smith et al. |
| 2009/0006628 A1 | 1/2009 | Webb et al. |
| 2009/0298513 A1 | 12/2009 | Hampel et al. |
| 2010/0120450 A1 | 5/2010 | Herz |

FOREIGN PATENT DOCUMENTS

| | | |
|---|---|---|
| JP | 2010-48797 A | 3/2010 |
| KR | 10-0651912 B1 | 11/2006 |
| KR | 10-2008-0049291 A | 6/2008 |
| KR | 10-2008-0110593 A | 12/2008 |
| KR | 10-2009-0004444 A | 1/2009 |
| KR | 10-2010-0121650 A | 11/2010 |
| WO | 2009/114222 A1 | 9/2009 |

FIG. 3

| Interface | Server | Client | Transport Protocol | Notes |
|---|---|---|---|---|
| D1 | Content Server | QPE | As defined in Clause 10 | |
| P1 | Content Policy Server | QPE | HTTP/1.1 or HTTPS/1.1 | |
| D2 | QPE | Player | As defined in Clause 10.2.2 | |
| Q2 | QPE | Local Application | HTTP/1.1 or HTTPS/1.1 or an implementation specific transport | Local applications may use an implementation-specific transport if supported by the Client |
| P2 | Network Policy Client | QPE | Implementation-specific IPC transport | |
| D3 | Intermediate Device | QPE | HTTP/1.1 or HTTPS/1.1 | |
| Q3 | QPE | Intermediate Device | UPnP/HTTP/1.1 as defined in Clause 10 | |
| D4 | Content Server | Intermediate Device | HTTP/1.1 or HTTPS/1.1 | |
| P4 | Content Server | Intermediate Device | HTTP/1.1 or HTTPS/1.1 | Only Policy XML structures may be downloaded in this manner |
| Q4 | Content Server | Intermediate Device | HTTP/1.1 or HTTPS/1.1 | Q4 transactions may be initiated by the Content Server via an external trigger not defined in this specification |
| S | Virtual Storage Device | QPE | Implementation-specific transport | |

METHOD, APPARATUS, AND SYSTEM FOR PERFORMING UNSOLICITED LOCATION-BASED DOWNLOAD

CROSS REFERENCE TO RELATED APPLICATIONS

This application is the National Phase of PCT/KR2013/001481 filed on Feb. 25, 2013, which claims priority under 35 U.S.C. 119(e) to U.S. Provisional Application No. 61/602,598 filed on Feb. 24, 2012, all of which are hereby expressly incorporated by reference into the present application.

BACKGROUND OF THE INVENTION

1. Field of the Invention

The present invention relates to a method, apparatus, and system for unsolicited location-based downloading and, more particularly, to a method, apparatus, and system for unsolicited location-based downloading, which are capable of the unsolicited downloading of content onto a client device based on location information according to a movement of the client device, for example, a predicted location and a predicted period.

2. Related Art

Recently, as ultra-high speed wireless communication infrastructure is constructed and a variety of types of wireless portable devices are spread out, tasks performed through an existing fixed device, such as a personal computer (PC), have become able to be performed using a mobile device. In particular, a smart device, such as a smart pad or a smart phone, excellently provides portability, that is, the greatest advantage of a mobile device, has performance no less than a PC and a screen much larger than an existing screen, and thus has become able to provide services of new and convenient types that could not be provided by the existing fixed device.

A mobile device, such a smart device, is used for information searches through the Internet, for example, a variety of types of service fields, such as e-commerce, online banking, game, navigation, and mobile messenger service, based on a variety of types of applications installed on the mobile device. Furthermore, the mobile device is increasingly used through interoperation with home devices within a home network, such as accessing the home network and controlling the home devices, sending content to a home device, or receiving content from a home device.

As mobile devices are increasingly used in geometrical progression as described above, a subject device that consumes content is suddenly shifted from an existing PC, etc. to a mobile device. For example, a user may download a variety of types of content, such as desired movies, music, and game, using a mobile device while in motion.

As mobile devices are increasingly used, there is an increasing need for user convenience. For example, a user may move to several areas while carrying a mobile device. In this case, the user may want to watch content using the mobile device in a specific area.

To this end, the user has to search for the desired content one by one using the mobile device and to request the downloading of the content. However, this is a very inconvenient behavior from a viewpoint of the user, and it is difficult for the user to search for a server capable of efficiently sending content in an area where the user is placed. Accordingly, there is an urgent need for the development of a technology capable of conveniently downloading proper content from a proper server to a mobile device by taking a movement of the mobile device into consideration.

SUMMARY OF THE INVENTION

The present invention has been made to solve such problems, and an object of the present invention is to provide a method, apparatus, and system for unsolicited location-based downloading, which are capable of the unsolicited downloading of content onto a client device based on the location of the client device on the basis of location information according to a movement of the client device, for example, a predicted location, a predicted period, etc.

In order to achieve the object, in an aspect, the present invention provides a method for unsolicited location-based downloading. The method for unsolicited location-based downloading includes steps of setting a location report interval for updating information about the location of a client device; updating the location information of the client device based on the location report interval; reporting the updated location information to a server; receiving a predicted location and predicted period of the client device and a source universal resource identifier (URI) for downloading content from the server; and downloading the content based on the predicted location, the predicted period, and the source URI. The location information of the client device may include the predicted location and predicted period of the client device.

The method may further include steps of determining whether or not the server supports unsolicited downloading and obtaining a server URI for the unsolicited downloading based on the determination.

The method may further include steps of displaying a user interface that requests the unsolicited downloading to be activated and enabling the unsolicited downloading in response to a request signal received through the user interface.

The step of updating the location information of the client device may include a step of periodically updating the predicted location and predicted period of the client device at the location update interval using a device location prediction algorithm.

The device location prediction algorithm may include at least one of a first prediction algorithm for predicting the future location of the client device based on the current movement direction and movement speed of the client device; a second prediction algorithm for predicting the future location of the client device based on the movement history of the client device during a set period; and a third prediction algorithm for predicting the future location of the client device using the preferred location and preferred period received from a user.

The step of reporting the updated location information may include a step of sending a message, including the updated predicted location and predicted period of the client device, to the server. The step of receiving the source URI capable of accessing a source from which the content corresponding to the predicted location and the predicted period is to be downloaded from the server may include a step of receiving a queue request, including the predicted location, the predicted period, and the source URI, from the server.

The step of receiving the source URI capable of accessing a source from which the content corresponding to the predicted location and the predicted period is to be downloaded from the server may include a step of receiving a message, including the predicted location, the predicted period, and the source URI, from the server. The unsolicited downloading method may further include a step of generating a queue request including the predicted location, the predicted period, and the source URI.

The step of downloading the content based on the predicted location, the predicted period, and the source URI may include a step of sending a queue request to a source corresponding to the source URI when the client device enters the predicted location and a step of downloading the content from the source in response to the queue request.

The step of reporting the updated location information may include a step of sending the current location of the client device to the server based on a predetermined location report interval. The predicted location may be plural, and the unsolicited downloading method may further include a step of assigning priority to each of the predicted locations according to predetermined criteria.

The method may further include steps of displaying a user interface capable of designating the preferred location and the preferred period and setting the preferred location and the preferred period in response to a signal received from the user interface. The highest priority may be assigned to the preferred location and the preferred period in the location information.

Meanwhile, in order to achieve the object, in another aspect, the present invention provides an apparatus for unsolicited location-based downloading. The apparatus for unsolicited location-based downloading may include a first unit setting a location report interval for updating information about the location of a client device and updating the location information of the client device based on the location report interval and a second unit reporting the updated location information to a server, receiving the predicted location and predicted period of the client device and a source URI for downloading content from the server, and downloading the content based on the predicted location, the predicted period, and the source URI.

The second unit may determine whether or not the server supports unsolicited downloading and obtain the server URI for the unsolicited downloading from the server based on the determination.

The first unit may display a user interface that requests the unsolicited downloading to be activated and enables the unsolicited downloading in response to a request signal received through the user interface. The first unit periodically updates the predicted location and predicted period of the client device at the location update interval using a device location prediction algorithm.

The second unit may send a message, including the updated predicted location and predicted period of the client device, to the server. The second unit may manage a queue request including the predicted location, the predicted period, and the source URI when the queue request is received from the server, and may generate a queue request based on the predicted location, the predicted period, and the source URI when the predicted location, the predicted period, and the source URI are received from the server.

Meanwhile, in order to achieve the object, in yet another aspect, the present invention provides a system for unsolicited location-based downloading. The system for unsolicited location-based downloading includes a client device and a content server capable of interoperating each other. The client device may set a location report interval for updating information about the location of the client device, may update the location information of the client device based on the location report interval, may report the updated location information to the content server, may receive a predicted location and predicted period of the client device and a source URI for downloading content from the content server, and may download the content based on the predicted location, the predicted period, and the source URI.

As described above, in accordance with the present invention, the unsolicited downloading of content onto a client device can be performed based on prediction information according to a movement of the client device, for example, a predicted location and a predicted period. Accordingly, when a user who carries a client device moves, the user can conveniently watch and use required information or information desired by the user in an area where the user is placed without an inconvenient procedure.

BRIEF DESCRIPTION OF THE DRAWINGS

FIG. 3 is a table for illustrating the interfaces illustrated in FIG. 2.

DESCRIPTION OF EXEMPLARY EMBODIMENTS

Figure 1:
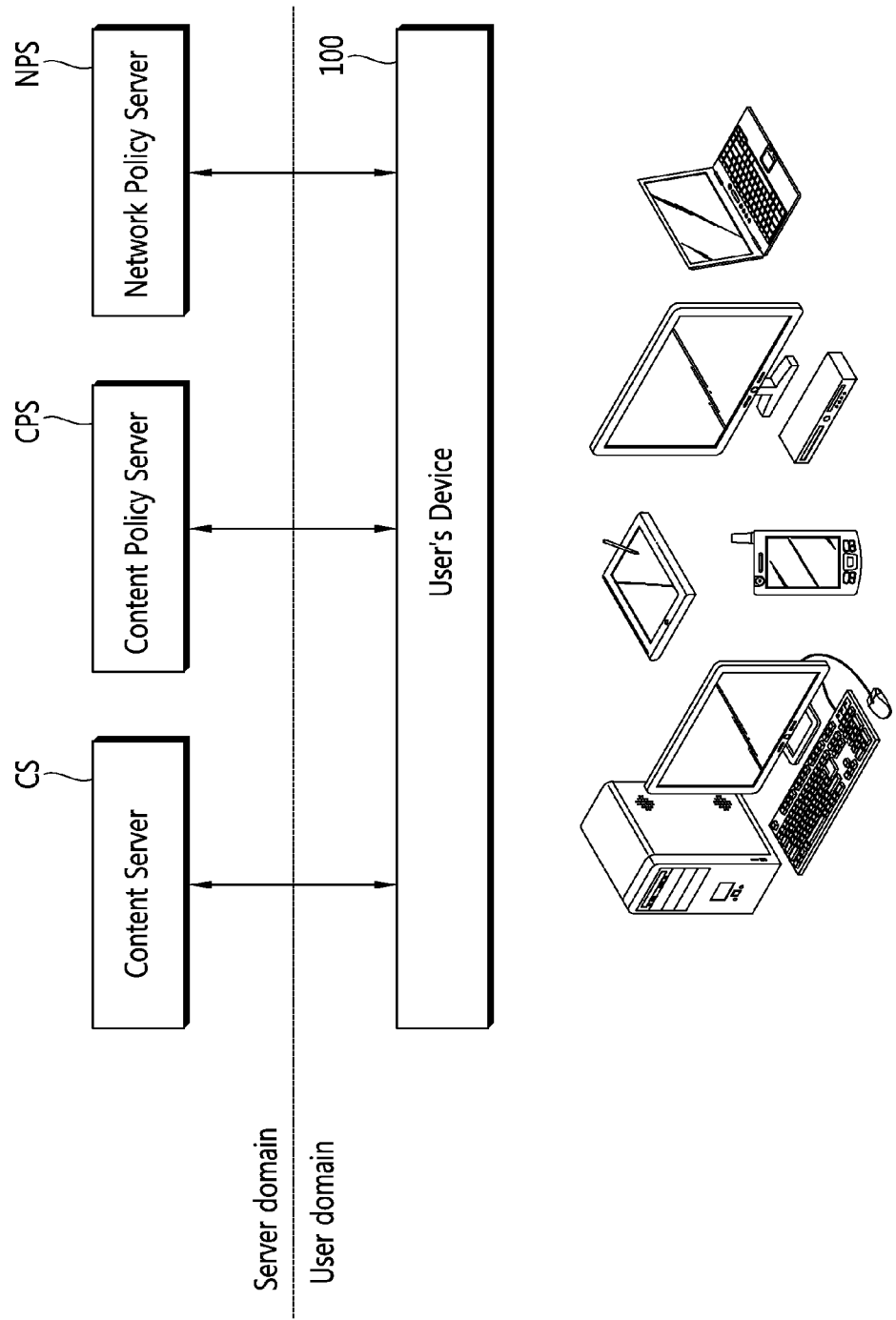
FIG. 1 is a block diagram illustrating the configuration of a content service system to which an unsolicited location-based downloading method in accordance with a preferred embodiment of the present invention will be applied.

The present invention may be modified in various ways and may be implemented to have several embodiments. Specific embodiments are illustrated in the drawings and are described in detail. It is however to be understood that the present invention is not intended to be limited to the specific embodiments, but that the specific embodiments include all modifications, equivalents, and substitutions which fall within the spirit and technical scope of the present invention.

Terms, such as the first and the second, may be used to describe various elements, but the elements should not be restricted by the terms. The terms are used to only distinguish one element from the other element. For example, a first element may be named a second element without departing from the scope of the present invention. Likewise, a second element may be named a first element. The term "and/or" includes a combination of a plurality of related and illustrated items or any one of a plurality of related and described items.

When it is said that one element is "connected" or "coupled" with the other element, it should be understood that one element may be directly connected or coupled with the other element, but a third element may exist between the two elements. In contrast, when it is said that one element is "directly connected" or "directly coupled" with the other element, it should be understood that a third element does not exist between the two elements.

The terms used in this application are used to only describe specific embodiments and are not intended to restrict the present invention. An expression of the singular number includes an expression of the plural number unless clearly defined otherwise in the context. In this application, terms, such as "comprise" or "have", are intended to designate that characteristics, numbers, steps, operations, elements, or parts which are described in the specification, or a combination of them exist, and should not be understood that they exclude the existence or possible addition of one or more other characteristics, numbers, steps, operations, elements, parts, or combinations of them in advance.

All terms used herein, unless defined otherwise, have the same meanings as those typically understood by those having ordinary skill in the art. The terms, such as ones defined in common dictionaries, should be interpreted to have the same meanings as terms in the context of pertinent technology, and should not be interpreted to have ideal or excessively formal meanings unless clearly defined in the specification.

Hereinafter, some exemplary embodiments of the present invention are described in more detail with reference to the accompanying drawings. In describing the present invention, in order to help general understanding, the same reference numerals are used to denote the same elements throughout the drawings, and a redundant description of the same elements is omitted.

FIG. 1 is a block diagram illustrating the configuration of a content service system to which an unsolicited location-based downloading method in accordance with a preferred embodiment of the present invention will be applied.

As illustrated in FIG. 1, the content service system may be divided into a server domain and a user domain.

The server domain may operate services, network policies, etc. for content services, and may provide content to the user domain based on the policies. That is, the server domain may mean a domain that includes servers for providing content services. Such a server domain may perform the providing of content to the user domain, the operation of services for the user domain, etc., such as the production, selling, distribution, policy operation, and rights limit of content.

The server domain may include a Content Server (CS) for providing content, a Content Policy Server (CPS) for operating policies for content services, a network policy server (NPS) for operating a network policy, etc. The number of CSs may be plural. For example, the server domain may include a content downloading server for content downloading, a content streaming server for content streaming, and so on.

The user domain may include the devices 100 of users. The devices 100 may be fixed type terminals, such as PCs and set-top boxes, or may be portable terminals, such as smart phones, portable phones, mobile handsets, tablets, Personal Digital Assistants (PDAs), and laptop computers. The devices 100 may access a local network based on UPnP, a DLNA, etc., and may be interoperated each other through wired or wireless communication.

The device 100 of a user may be a Client Device (CD) or an intermediate device.

The CD may mean a physical hardware device that is equipped with at least one network interface and local storage. For example, the CD may be a mobile handset, a tablet, a smart phone or the like which may consume content. The CD may include modules for being supplied with content service.

The intermediate device may be a dual role client/server device on a network that may be used to stage assets destined for a CD. The intermediate device may temporarily hold an asset until the asset is delivered to the CD. In general, the intermediate device does not directly consume content, but may directly consume content. For example, the intermediate device may stage content. That is, the intermediate device may download content from a server and store and play back the content.

Figure 2:
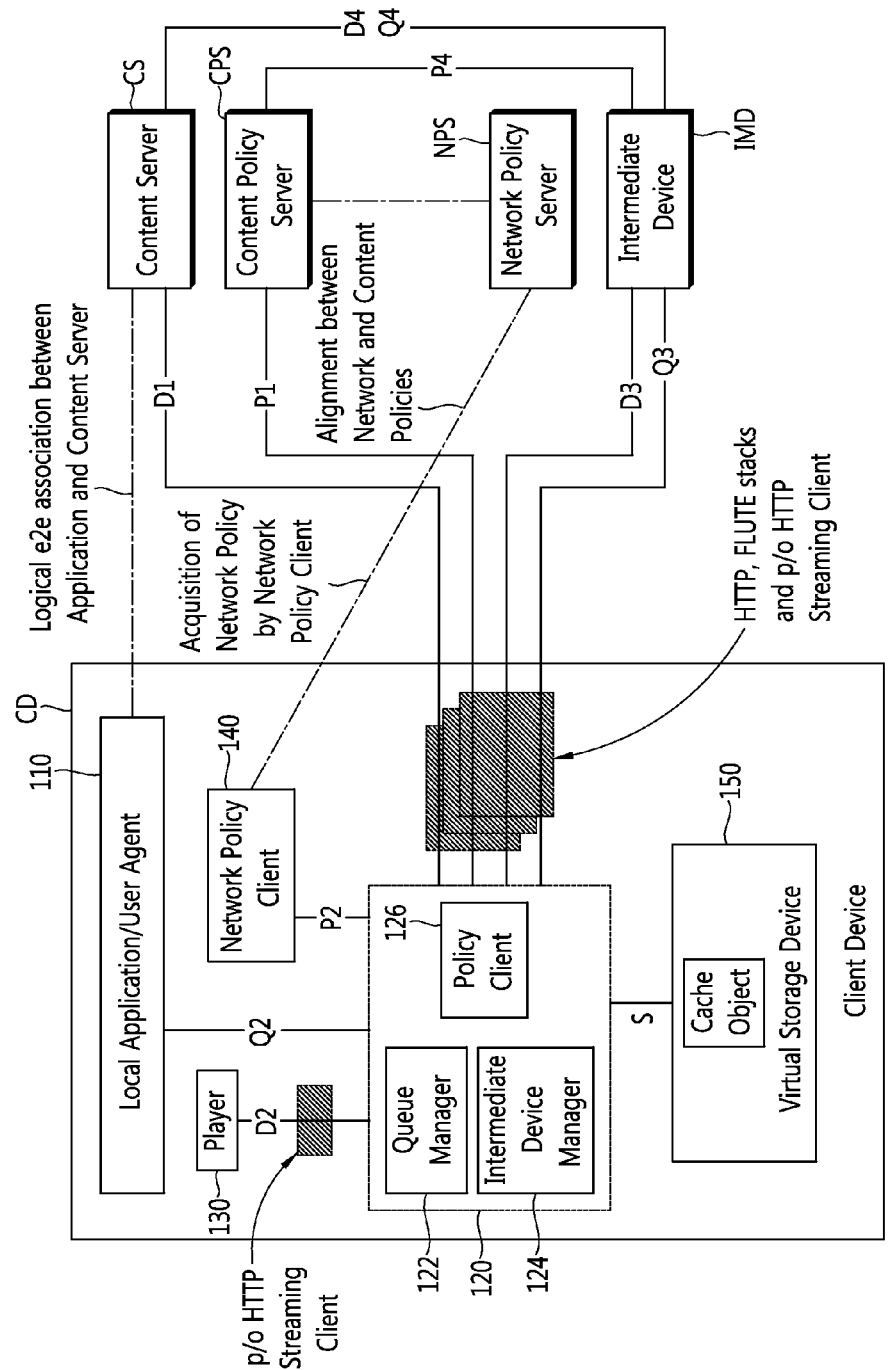
FIG. 2 is a block diagram illustrating the detailed configuration and related interfaces of the client device of the content service system.

FIG. 2 is a block diagram illustrating the detailed configuration and related interfaces of the CD of the content service system.

As illustrated in FIG. 2, the CD may include a local application/user agent 110, a player 130, a network policy client 140, a virtual storage device 150, a Queue/Policy Engine (QPE) 120, etc.

The local application/user agent 110 may mean software for content service and may include a local application and a user agent. For example, the local application/user agent 100 may provide user interfaces, service menus, service selection, content selection, and son on for allowing a user to be supplied with content service.

The local application is software that resides in the CD, and may communicate with the QPE 120 using a specific interface protocol, for example, a Q2 interface protocol. The user agent may means software for rendering and executing a server-supplied application, such as the web browser or middleware of the CS. The local application/user agent 100 may become active when the downloading of content is started or completed.

The player 130 is for playing back content provided through content service, and may be, for example, a media player capable of playing back downloading content or streaming content. The network policy client 140 may obtain a network policy while communicating with an NPS and may control the CD according to the obtained network policy.

The virtual storage device 150 is a representation of a local depository that may be accessed through a cache object. For example, the virtual storage device 150 may be a common local depository, such as a hard disk, USB memory connected to a device, flash memory, a virtual region, such as Demon, or the like.

When a policy given by a CPS or an NPS is satisfied, the QPE 120 of the CD may send a request for the caching/downloading of content in order to cache/download specific content (asset) of a content server. Such a request may be called a queue request. For example, the queue request may include an URI corresponding to the content (asset). The queue request may further include a codec type media profile, a container type, a Multipurpose Internet Mail Extension (MIME) type, a store name, a total length of the queue request, content information, policy information, and so on. Furthermore, the queue request may include bandwidth information for each source URL estimated by the local application/user agent 110.

The QPE 120 is a module included in the CD, and may perform communication through interface protocols P1, S, D1, D2, Q2, D3, and Q3. The QPE 120 may maintain a queue on behalf of each local application and a Content Server (CS), may interface with storage, and may be responsible for synchronizing a queue request with a policy. Accordingly, the QPE may also be called a service client for content sharing service.

Such a QPE 120, that is, a QPE, may include a queue manager 122, a policy client 126, an intermediate device manager 124, and so on.

The queue manager 122 may operate a queue for the downloading or streaming of content. For example, the queue manager 122 may include a stream queue manager and a downloading manager. The queue manager 122 may send a queue request to an intermediate device (IMD) and receive a corresponding response from the IMD, or may receive a queue request from an IMD and send a corresponding response. For example, the queue manager 122 may send a queue request that requests an IMD to download specific content from the CS, to the IMD and receive a corresponding response. The queue manager 122 may send, to the IMD, a queue request that requests the IMD to send the content, downloaded from the CS, to the CD.

Furthermore, the queue manager 122 may perform a rights check for the use of content. For example, the queue manager 122 may perform a rights check for staging an asset, corresponding to content selected by the local application/user agent 110, through an IMD, for example, a rights check for downloading an asset from the CS to the IMD. The rights check may include a Digital Right Management (DRM) capability check and a license check.

In the DRM capability check, whether or not the IMD may support a DRM system that protects the asset may be verified based on information about the DRM of the asset and DRM capabilities regarding the IMD. In the license check, whether or not the license IMD may obtain a license for the use of the asset may be verified. For example, the license check may be the check of rights defined in a right token.

The reception of a requested asset managed by a queue may be achieved using unicast downloading, multicast downloading, or a combination of the two mechanisms. The QPE 120 needs to preserve a single queue although the priorities or order of instructions defined in a queue interface are changed.

The policy client 126 is a subsystem of the QPE 120, and maintains a policy object. The policy client 126 may control the QPE 120 according to policies from a CPS. For example, the policy client 126 may retrieve policies from a CPS and adjust a queue request behavior.

The intermediate device manager 124 may manage IMDs which operates in conjunction with the CD. For example, the intermediate device manager 124 may discover an IMD connected to a network and manage the state of the IMD. The intermediate device manager 124 may send or receive required messages to or from an IMD.

FIG. 3 is a table for illustrating the interfaces illustrated in FIG. 2.

As illustrated in FIG. 3, the interfaces related to the content service system may be classified into P, Q, S, and D interface groups. The interfaces may operate in conjunction with each other in a client-server structure.

The P interface group may define a link and policy between the QPE 120 and a CPS. Such a P interface group may include interfaces P1 and P2. In the interface P1, a server may be a CPS, and a client may be the QPE 120. In the interface P2, a server may be the network policy client 140, and a client may be the QPE 120. In an interface P4, a server may be a CS, and a client may be an IMD.

The Q interface group may define queue request handling. The Q interface group may be a primary command channel which associates a CS, IMDs, and the QPE 120 with each other. The Q interface group may allow a caching functionality to be called by a local application. In a Q2 interface, a server may be the QPE 120, and a client may be a local application.

A queue request presented via a Q2 interface protocol, that is, an interface between a local agent and the QPE, includes a complete URL that may be called from a user agent o the context of a calling local application in order to download an asset. Alternatively, the queue request may include a local URL which calls a calling local application for the purpose of pre-negotiated downloading.

In a Q3 interface, a server may be the QPE 120, and a client may be an IMD. In a Q4 interface, a server may be a CS, and a client may be an IMD.

The S interface group may abstract storage and cache capabilities to the QPE. In the S interface, a server may be the virtual storage device 150, and a client may be the QPE 120.

The D interface group may be used to send data. In a D1 interface, a server may be a CS, and a client may be the QPE 120. In a D2 interface, a server may be the QPE 120, and a client may be the player 130. In a D3 interface, a server may be an IMD, and a client may be the QPE 120. In a D4 interface, a server may be a CS, and a client may be an IMD.

The content service system described with reference to FIGS. 1 to 3 may perform unsolicited downloading based on the location of a CD. Unsolicited location-based downloading may automatically download content onto a CD based on the location of the CD although a user does not make a request. That is, unsolicited downloading may be called a form of predicted content delivery that is not initiated although a user requests content.

Figure 4:
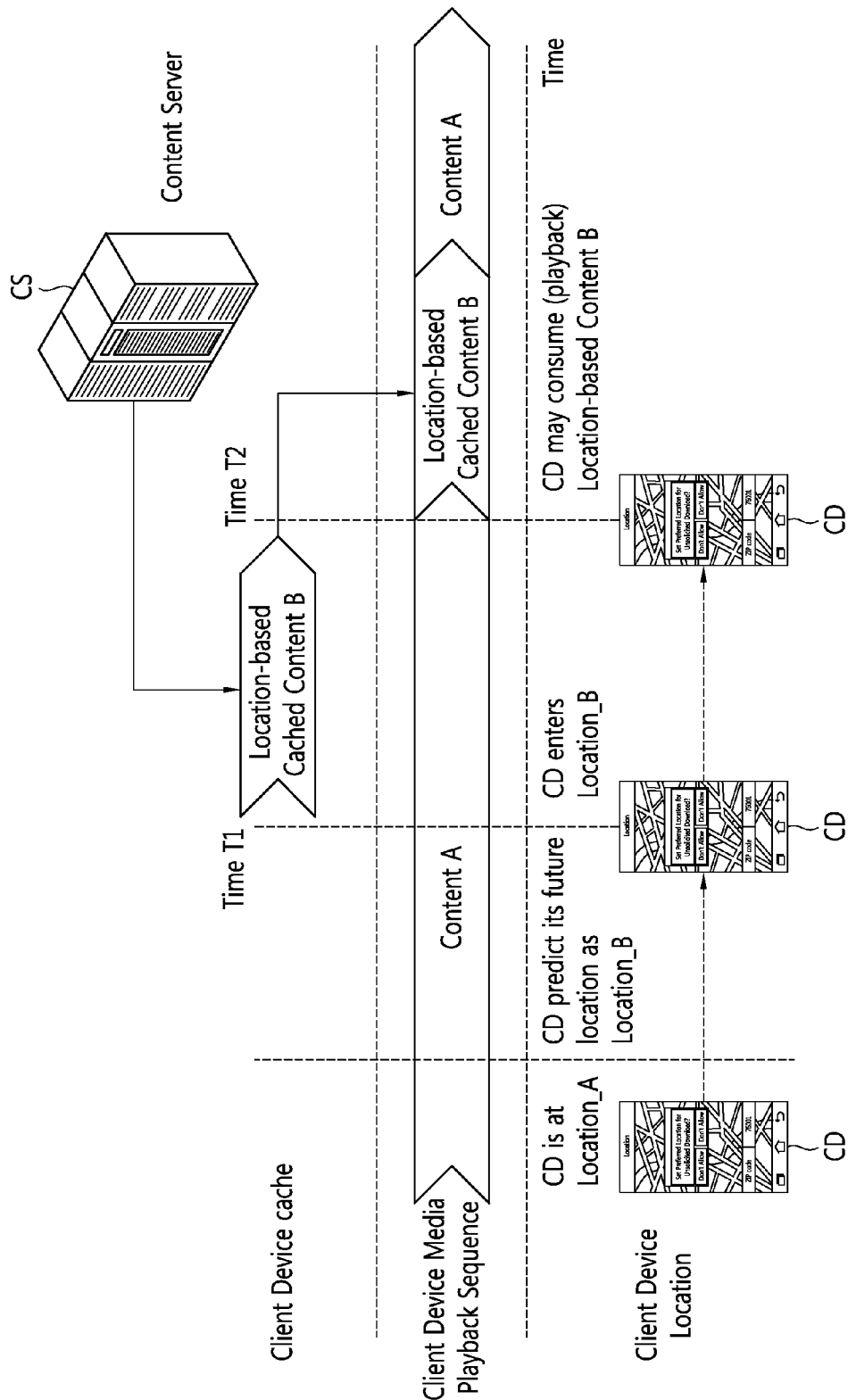
FIG. 4 is an exemplary diagram for schematically illustrating unsolicited content downloading in accordance with a preferred embodiment of the present invention.

FIG. 4 is an exemplary diagram for schematically illustrating unsolicited content downloading in accordance with a preferred embodiment of the present invention.

As illustrated in FIG. 4, first, a Client Device (CD) is placed at a location A. In this case, it is assumed that the CD plays back content A.

A user wants that any designated content is automatically cached or downloaded onto the CD when the location of the CD is changed. To this end, the CD is set so that unsolicited downloading is enabled.

When the unsolicited downloading is enabled, the CD may predict the near future location of the CD based on a location prediction algorithm. For example, the CD may predict that the CD will be placed at a location B in the near future. Furthermore, the CD may predict a period in which the CD is placed at the location B. For example, the CD may predict the period in which the CD is placed at the location B as a period from T1 to T2.

The CD may report pieces of information, predicted at a set interval, to a Content Server (CS). The CS may detect a source from which the content will be suitably downloaded onto the CD at the location B during the period of T1 to T2 based on the pieces of information received from the CD, and may transfer a source URI, corresponding to the source, to the CD.

When the CD enters the location B at the time T1, the CD may download content B using the source URI received from the CS. That is, the content B is automatically cached in the CD based on the location of the CD. Next, the CD may temporarily stop the playback of the content A and play back the content B corresponding to the location B. Accordingly, while the CD is placed at the location B, the CD may play back the content B.

Meanwhile, to predict the near future location of the CD may be performed by the CS. In such a case, When the unsolicited downloading is enabled, the CD may periodically send the current location of the CD to the CS at a predetermined interval. The CS may predict the near future location of the CD based on the current location of the CS. For example, the CS may predict that the CD will be placed at the location B in the near future. Furthermore, the CS may predict that a period in which the CD is placed at the location B. For example, the CS may predict the period in which the CD is placed at the location B as the period of T1 to T2.

The CS may detect a source from which content will be suitably downloaded onto the CD at the location B during the period of T1 to T2, and may transfer a source URI, corresponding to the source, to the CD. When the CD enters the location B at the time T1, the CD may download the content B using the source URI received from the CS.

Figure 5:
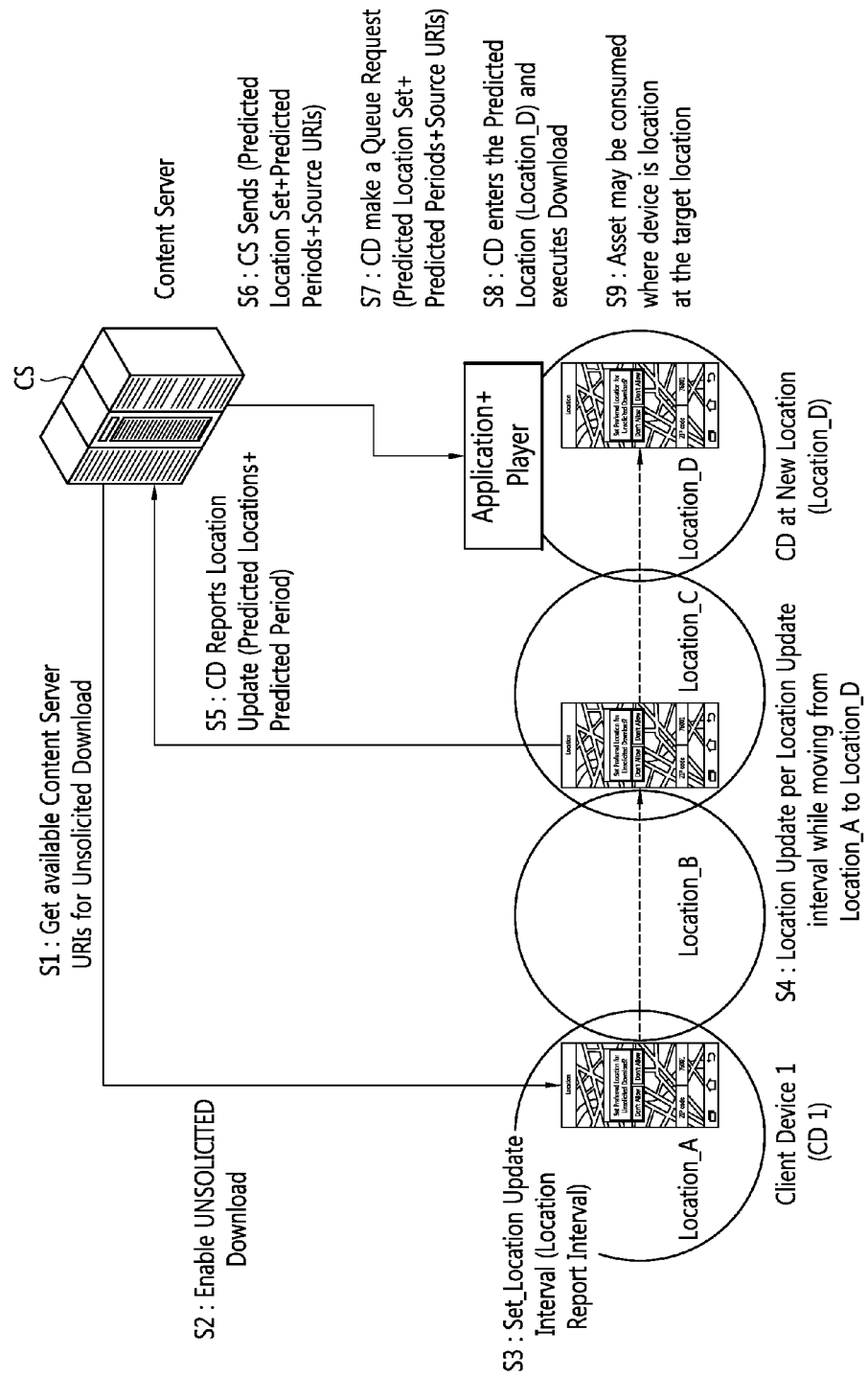
FIG. 5 is an exemplary diagram for illustrating an unsolicited location-based downloading method in accordance with another preferred embodiment of the present invention.

FIG. 5 is an exemplary diagram for illustrating an unsolicited location-based downloading method in accordance with another preferred embodiment of the present invention.

As illustrated in FIG. 5, first, a CD gets an available CS URI of at least one CS for unsolicited downloading from the CS (step: S1). The CS URI may mean a single source URI or a plurality of source URIs on which the CS receives a predicted location report from the CD.

The CS URI may be represented as a property "ContentServer_URI". The "ContentServer_URI" may be included in a set of unsolicited downloading configuration properties, that is, a set of properties for unsolicited downloading.

Next, the CD enables, that is, activates, the unsolicited downloading for the unsolicited downloading (step: S2). For example, the CD may set a property "Unsolicited_Enabled" as a true value. If the "Unsolicited_Enabled" is true, this means that an unsolicited request for predictive content delivery is enabled. The "Unsolicited_Enabled" is a property included in the set of unsolicited downloading configuration properties.

Figure 6:
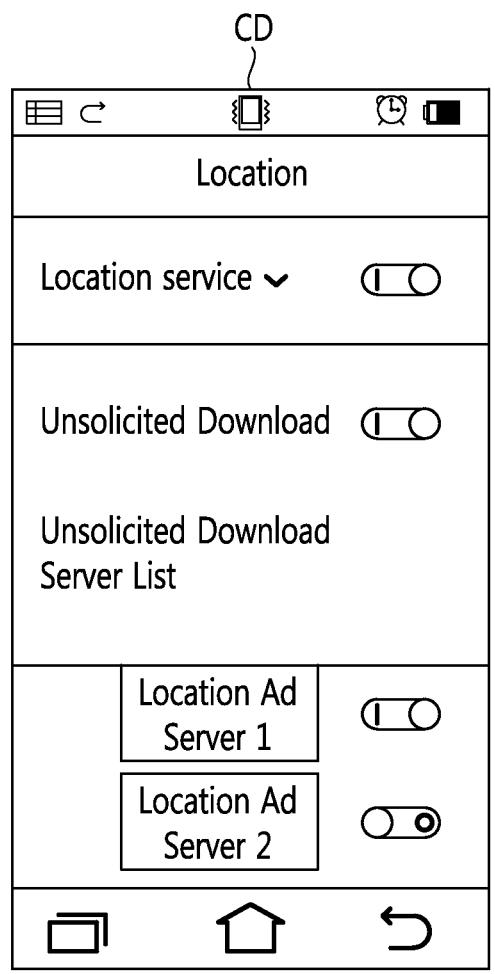
FIG. 6 illustrates a user interface in which unsolicited downloading may be enabled in response to a request from a user.

FIG. 6 illustrates a user interface in which unsolicited downloading may be enabled in response to a request from a user.

As illustrated in FIG. 6, first, it is assumed that a CD is placed at a location A. The CD may display an unsolicited downloading enable/disable selection icon capable of enabling or disabling unsolicited downloading. For example, in order to enable unsolicited downloading, a user may select the unsolicited downloading enable/disable icon, for example, may touch the unsolicited downloading enable/disable icon. When the user requests unsolicited downloading to be enabled using the unsolicited downloading enable/disable icon, the CD may enable the unsolicited downloading. For example, the CD may set the property "Unsolicited_Enabled" as a true value.

Meanwhile, the user interface may display a selection unit which enables a user to select a desired server from which unsolicited downloading service will be provided from a plurality of servers that supports unsolicited downloading. For example, the user interface may display a "location advertising server 1", a "location advertising server 2", and so on, and may allow a user to select at least one server. In this case, the selected server and the CD perform unsolicited downloading by performing the interoperation procedure between a CS and the CD according to the present invention.

When the unsolicited downloading is activated, the CD may set a location update interval (step: S3). The location update interval may be represented as a property "LocationUpdateInterval". The location update interval may represent a time period in which the CD shall update its predicted location. The location update interval may be a location report interval. The location report interval may be represented as a data value "LocationReportInterval". The location update report interval may represent a time period in which the CD reports the predicted location to a predetermined CS.

Figure 7:
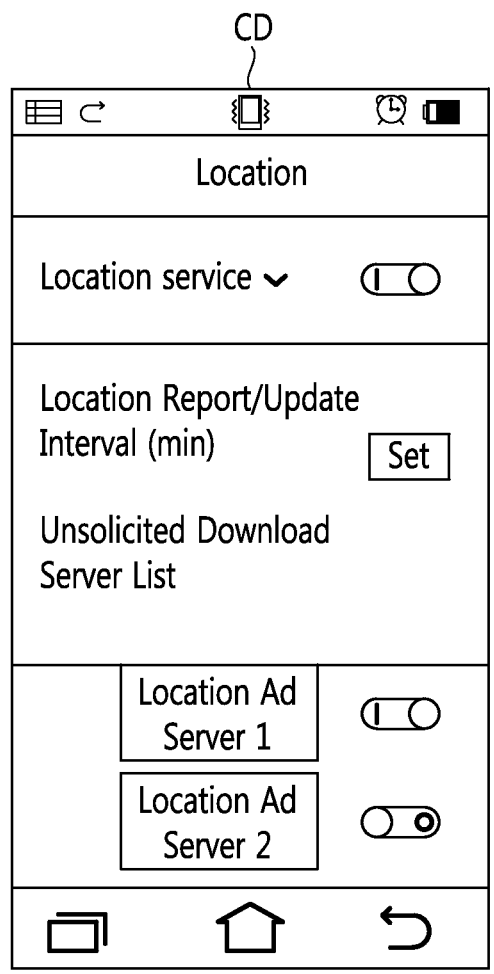
FIG. 7 illustrates a user interface in which a location update/report interval is set.

FIG. 7 illustrates a user interface in which a location update/report interval is set.

As illustrated in FIG. 7, a CD may display the user interface including a setting unit capable of setting a location update/report interval. For example, the location update/report interval may be set by the second, by the minute, by the hour, or the like.

The "LocationUpdateInterval" or "LocationReportInterval" may be properties included in the set of unsolicited downloading configuration properties.

Meanwhile, in the present embodiment, the location update interval and the location report interval are illustrated as being the same, but the present invention is not limited thereto. In another embodiment, the location update interval and the location report interval may be considered to be different and may be set differently. For example, a CD may set the location update interval to 5 minutes and the location report interval to 20 minutes, and may report updated predicted location to the CS during four location update intervals every location report interval.

When the location update interval is set, the CD may update information about the location of the CD every location update interval while the CD moves (step: S4). In this case, the location information may include the predicted location and predicted period of the CD. More specifically, the CD may predict that the CD will be placed when and where in the future using the device location prediction algorithm. The CD may update the location information, for example, the predicted location and the predicted period based on predicted information according to such prediction.

For example, assuming that a current time is 1:00 p.m., the CD may predict that the CD will be placed at a location B during a period from 5 p.m. to 6 p.m. That is, the CD may update the "location B", that is, the predicted location, using the "period from 5 p.m. to 6 p.m.", that is, the predicted period.

The predicted location may be represented as a property "PredictedLocation", and the predicted period may be represented as a property "PredictedPeriod".

The "PredictedLocation" may represent a predicted geographical location of the CD at a time period "PredictedPeriod", that is, in the predicted period.

The predicted location may be represented as a combination of the latitude and the longitude. Information about the latitude and the longitude may be, for example, a "DDD:MM:SS.SSSS, DDD:MM:SS.SSS" form. In this case, D is an angle, M is a minute of an arc (i.e., an angle of 1/60 of 1 degree), and S is a second of the arc (i.e., an angle of 1/3600 of 1 degree). The latitude and the longitude are comma-delimited. Meanwhile, the predicted location may be represented using information used to identify the location of the device in wireless communication, for example, a Service Set ID (SSID) of Wi-Fi, and may be represented using a cell ID of a Third Generation Partnership Project (3GPP) or Long Term Evolution (LTE) network.

The "PredictedLocation" may be generated by the CD and may be set by ZIP code. Such a predicted location may be used by a content provider, for example, a CS which supports the location-based prediction downloading of content.

The "PredictedPeriod" represents a predicted time period during which the CD would be at the predicted location.

The CD may set the priority of a location. The priority of the location is represented as a property "Location_Priority". The priority of the location may represent the priority of location information for using the location-based prediction downloading of content.

Meanwhile, the device location prediction algorithm for predicting the near future location of a CD may include at least one of a first prediction algorithm for predicting the future location of a CD based on the current movement direction and movement speed of the CD, a second prediction algorithm for predicting the future location of a CD based on the movement history of the CD during a set period, and a third prediction algorithm for predicting the future location of a CD using a preferred location and preferred period received from a user.

If the device location prediction algorithm includes two or more of the first prediction algorithm, the second prediction algorithm, and the third prediction algorithm, the priority of the location may be designated in a predicted location updated based on each of the prediction algorithms. Furthermore, a single prediction algorithm may be used to compute a plurality of predicted locations. In such a case, the priority of a location may be designated in each predicted location based on a parameter, such as the accuracy of precision.

The device location prediction algorithm may be included in a CD or may be included in a network device or a server that operates in conjunction with the CD. Meanwhile, in accordance with yet another embodiment, the device location prediction algorithm may be included in a CS. In such a case, a CD may send unsolicited downloading configuration properties and the current location of the CD to the CS based on a location update or report interval, and a predicted location and a predicted period may be generated and updated by the CS.

Referring back to FIG. 5, when the location information of the CD is updated, the CD may report the updated location information to the CS by sending a predicted location report, including the updated location information, to the CS using the CS URI (step: S5).

The updated location information reported to the CS includes a predicted location and a predicted period. For example, the updated location information reported to the CS may include properties "PredictedLocation" and "PredictedPeriod". For example, the predicted location may include geographical information about the location D, and the predicted period may include time period information indicative of a period in which the CD stays at the location D.

Meanwhile, if a plurality of predicted locations and predicted periods are present, the priority of a location may be designated in each of the predicted locations and the predicted periods. That is, the updated location information reported to the CS may further include "Location_PRIORITY".

The CS that has received the updated location information from the CD may select a source URI from which the CD may efficiently download content at the predicted location and in the predicted period or a source URI from which the CD may download content required for a user in a corresponding area, based on the predicted location and the predicted period, and may send the predicted location, the predicted period, and the selected source URI to the CD (step: S6).

In selecting the source URI, various factors, such as the contents (e.g., area information, and advertising, tourism information, predetermined content, etc. related to the area) of the content, a transmission bandwidth, a network state, network resources, and the profile of the content, may be taken into consideration according to predetermined criteria.

If a plurality of predicted locations and predicted periods are present, the CS may select a plurality of source URIs corresponding to the plurality of predicted locations and the plurality of predicted periods and transfer the plurality of source URIs to the CD. Furthermore, if priority is assigned to each predicted location—predicted period, the CS may transfer only at least one source URI, corresponding to at least one predicted location—at least one predicted period having high priority, to the CD according to predetermined criteria.

The CD that has received the predicted location, the predicted period, and the source URI from the CS may generate a queue request based on the pieces of received information (step: S7). The queue request requests that the content be transmitted to the CD when the CD enters the predicted location in the predicted period.

The queue request may include the predicted location, the predicted period, the source URI, and so on. For example, the queue request may include the properties "PredictedLocation", "PredictedPeriod", "Source_URI", and so on.

Furthermore, the queue request may further include "STORAGE_NAME" that is a property indicative of the number of a repository that will be used to store a cached object, that is, content, "CONTENT_TYPE" that is a property indicative of the Multipurpose Internet Mail Extension (MIME) content type of the cached object, "REQPROP_TOTAL_LENGTH" that is a property indicative of the size of the cached object in bytes, "UNSOLICITED_DOWNLOAD_PRIORITY" indicative of priority of a request for unsolicited downloading, and "AUTOMATIC_PLAYBACK_AFTER_DOWNLOAD" indicative whether or not an automatically queued asset will be played back after downloading, and so on. If the "AUTOMATIC_PLAYBACK_AFTER_DOWNLOAD" is true, the downloaded content is automatically played back by the CD.

If a plurality of predicted locations, predicted periods, and source URIs are present, the CD may generate a plurality of queue requests corresponding to the plurality of "predicted locations—predicted periods—source URIs".

The CD may send the generated queue request to the source using the source URI (step: S7). When the CD enters the predicted location, the CD downloads the content from the source URI (step: S8). For example, assuming that the predicted location is a location D and the predicted period is a period from 5 p.m. to 6 p.m., when the CD enters the location D at 5 p.m., the CD may download the content from the source. After downloading the content, the CD may consume the content until 6 p.m. while the CD is placed at the location D (step: S9).

Figure 8:
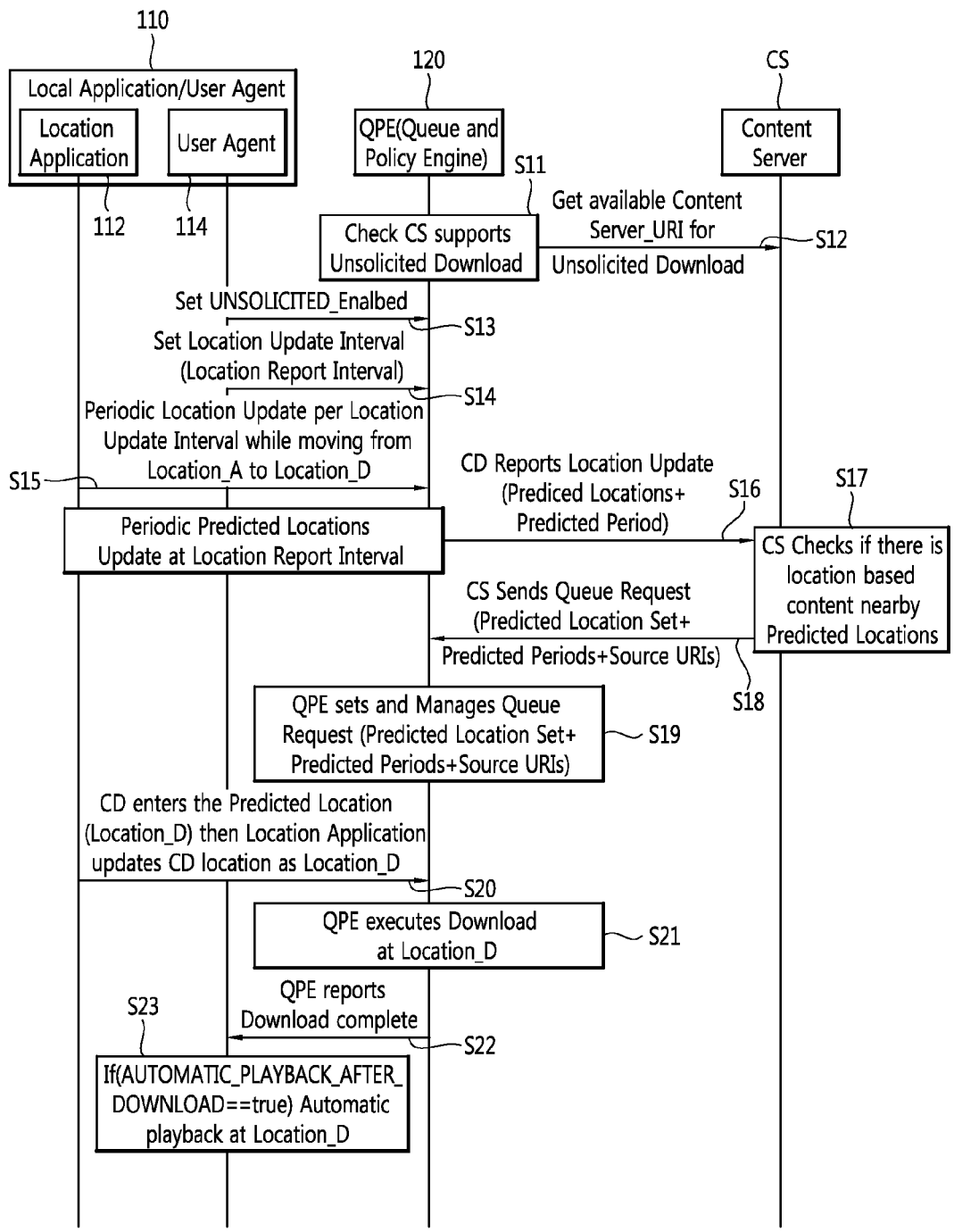
FIG. 8 is a flowchart illustrating a flow of an unsolicited location-based downloading method in accordance with another embodiment of the present invention.

FIG. 8 is a flowchart illustrating a flow of an unsolicited location-based downloading method in accordance with another embodiment of the present invention. In the embodiment illustrated in FIG. 8, it is assumed that a CD moves from a location A to a location D.

As illustrated in FIG. 8, first, the QPE 120 of the CD may check whether or not a CS supports unsolicited downloading (step: S11). If the CS supports the unsolicited downloading, the QPE 120 may request a CS URI to be used to report information about the location of the CD from the CS, and may obtain the CS URI from the CS (step: S12).

Next, the user agent 114 of the CD may enable unsolicited downloading (step: S13). For example, the user agent 114 may set the property "Unsolicited_Enabled", managed by the QPE 120, as a true value based on the user interface illustrated in FIG. 6.

When the unsolicited downloading is activated, the user agent 114 may set a location update interval (step: S14). For example, the user agent 114 may set "LocationUpdateInterval", managed by the QPE 120, based on the user interface illustrated in FIG. 7.

Thereafter, while the CD moves from the location A to the location D, the local application 112 of the CD may update the location information of the CD at the set location update interval (step: S15). In this case, the location information may include a predicted location and a predicted period. For example, the local application 112 may predict that the CD will be placed when and where in the future using a device location prediction algorithm included in the CD or an external device that operates in conjunction with the CD. The CD may update the location information, that is, the predicted location and the predicted period, based on such prediction.

Next, the QPE 120 may report the updated location information to the CS (step: S16). The updated location information may be a predicted location report, including the predicted location, the predicted period, etc. For example, the updated location information reported to the CS may include the properties "PredictedLocation" and "PredictedPeriod".

For example, the predicted location may include geographical information about the location D, and the predicted period may include time period information indicative of a period in which the CD stays at the location D. The updated location information reported to the CS may further include "Location_PRIORITY".

The CS checks whether content corresponding to the predicted location is present or not (step: S17), and may select the source URI of a source capable of providing the corresponding content. In selecting the source URI, various factors, such as the contents (e.g., area information, and advertising, tourism information, predetermined content, etc. related to the area) of the content, a transmission bandwidth, a network state, network resources, and the profile of the content, may be taken into consideration according to predetermined criteria.

Next, the CS may generate a queue request and send the queue request to the QPE 120 (step: S18). The queue request requests that the content be downloaded from the source to the CD when the CD enters the predicted location in the predicted period.

The queue request may include the predicted location, the predicted period, the source URI, and so on. For example, the queue request may include the properties "PredictedLocation", "PredictedPeriod", and "Source_URI". If a plurality of predicted locations, predicted periods, and source URIs are present, the CD may generate a plurality of queue requests corresponding to the plurality of "predicted locations—predicted periods—source URIs", and may send the plurality of queue requests to the QPE 120 of the CD.

The QPE 120 that has received the queue request from the CS may set and manage the received queue request (step: S19). When the CD enters the predicted location, for example, the location D, the local application 112 may update the current location of the CD based on the location D (step: S20). The QPE 120 may perform content downloading at the location D based on the queue request received from the CS (step: S21).

When the downloading of the content is completed, the QPE 120 reports that downloading has been completed to the user agent 114 (step: S22). In response thereto, the user agent 114 may play back the content (step: S23). If the property "AUTOMATIC_PLAYBACK_AFTER_DOWNLOAD" is true, the downloaded content is automatically played back by the CD.

Figure 9:
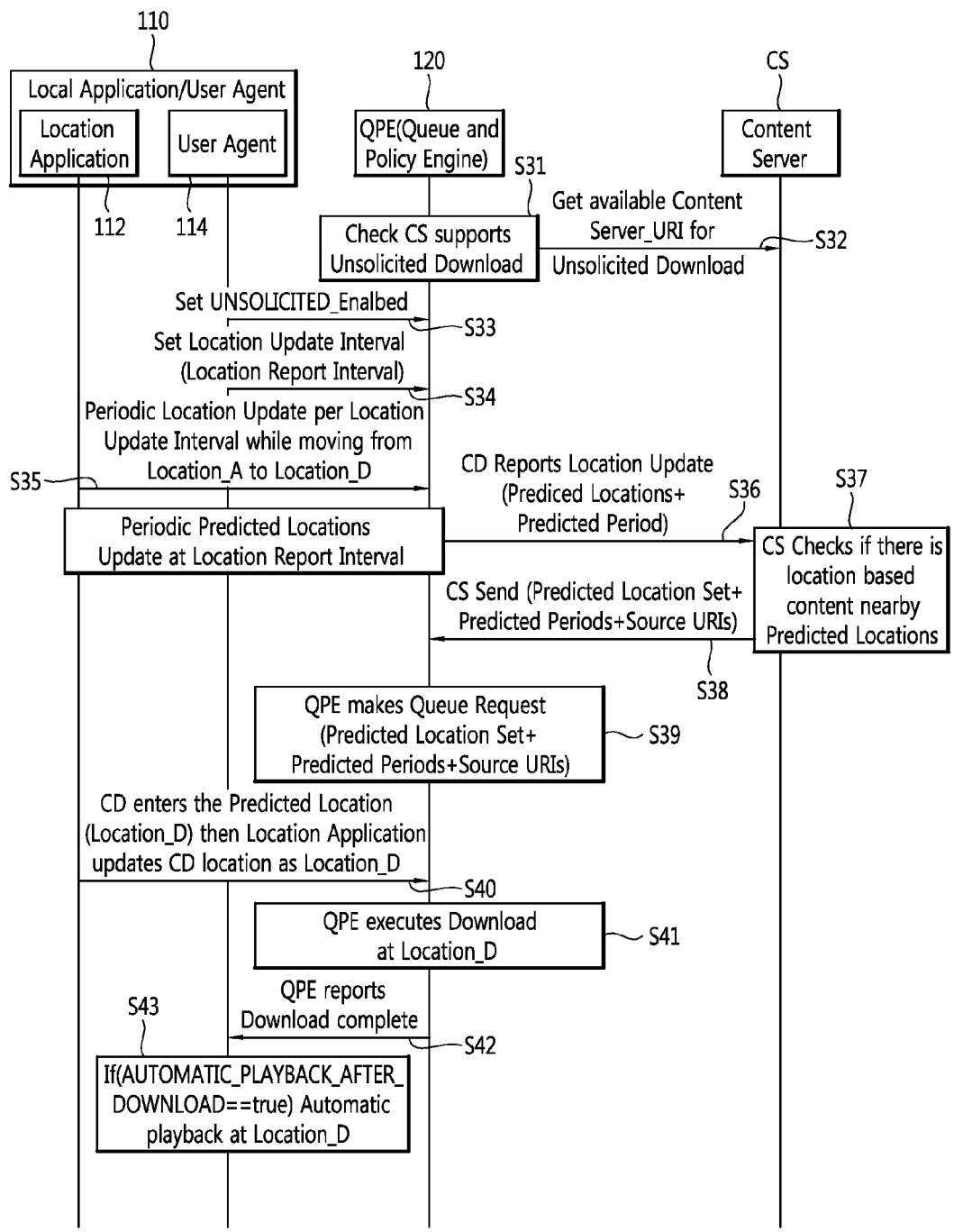
FIG. 9 is a flowchart illustrating a flow of an unsolicited location-based downloading method in accordance with yet another embodiment of the present invention, and illustrates an example in which a queue request is generated by a client device.

FIG. 9 is a flowchart illustrating a flow of an unsolicited location-based downloading method in accordance with yet another embodiment of the present invention, and illustrates an example in which a queue request is generated by a CD. In the embodiment illustrated in FIG. 9, it is assumed that the CD moves from a location A to a location D.

As illustrated in FIG. 9, first, the QPE 120 of the CD may check whether or not a CS supports unsolicited downloading (step: S31). If the CS supports the unsolicited downloading, the QPE 120 may request a CS URI that will be used to send a predicted location report from the CS, and may obtain the CS URI from the CS (step: S32).

Next, the user agent 114 of the CD may enable unsolicited downloading (step: S33). For example, the user agent 114 may set the property "Unsolicited_Enabled", managed by the QPE 120, as a true value based on the user interface illustrated in FIG. 6.

When the unsolicited downloading is activated, the user agent 114 may set a location update interval (step: S34). For example, the user agent 114 may set the "LocationUpdateInterval", managed by the QPE 120, based on the user interface illustrated in FIG. 7.

Thereafter, while the CD moves from the location A to the location D, the local application 112 of the CD may update information about the location of the CD at the set location update interval (step: S35). In this case, the location information may include a predicted location and a predicted period. For example, the local application 112 may predict that the CD will be placed when and where in the future using a device location prediction algorithm included in the CD or an external device that operates in conjunction with the CD. The CD may update the location information, that is, the predicted location and the predicted period, based on such prediction.

Next, the QPE 120 may report the updated location information to the CS (step: S36). The updated location information may be a predicted location report including the predicted location, the predicted period, and so on. For example, the updated location information predicted to the CS may include the properties "PredictedLocation" and "PredictedPeriod".

For example, the predicted location may include geographical information about the location D, and the predicted period may include time period information indicative of a period in which the CD stays at the location D. Meanwhile, the updated location information reported to the CS may further include "Location_PRIORITY".

The CS may check whether content corresponding to the predicted location is present or not (step: S37), and may select the source URI of a source capable of providing the corresponding content. In selecting the source URI, various factors, such as the contents (e.g., area information, and advertising, tourism information, predetermined content, etc. related to the area) of the content, a transmission bandwidth, a network state, network resources, and the profile of the content, may be taken into consideration according to predetermined criteria.

Thereafter, the CS may send the predicted location, the predicted period, and the source URI to the QPE 120 of the CD (step: 38). If a plurality of "predicted locations—predicted periods—source URIs" are present, the CS may generate a plurality of queue requests corresponding to the plurality of predicted locations—predicted periods—source URIs", and may send the plurality of queue requests to the QPE 120 of the CD.

The QPE 120 that has received the predicted location, the predicted period, and the source URI from the CS may generate a queue request based on the pieces of received information (step: S39). The queue request requests that the content be downloaded from the source to the CD when the CD enters the predicted location in the predicted period.

The queue request may include the predicted location, the predicted period, the source URI, and so on. For example, the queue request may include the properties "PredictedLocation", "PredictedPeriod", and "Source_URI". If a plurality of predicted locations, predicted periods, and source URIs are present, the QPE 120 may generate a plurality of queue requests corresponding to the plurality of "predicted locations—predicted periods—source URIs".

When the CD enters the predicted location, for example, the location D, the local application 112 may update the current location of the CD based on the location D (step: S40), and the QPE 120 may perform the downloading of the content at the location D based on the generated queue request (step: S41).

When the downloading of the content is completed, the QPE 120 reports that the downloading has been completed to the user agent 114 (step: S42). In response thereto, the user agent 114 may play back the content (step: S43). If the property "AUTOMATIC_PLAYBACK_AFTER_DOWNLOAD" is true, the downloaded content is automatically played back by the CD.

Figure 10:
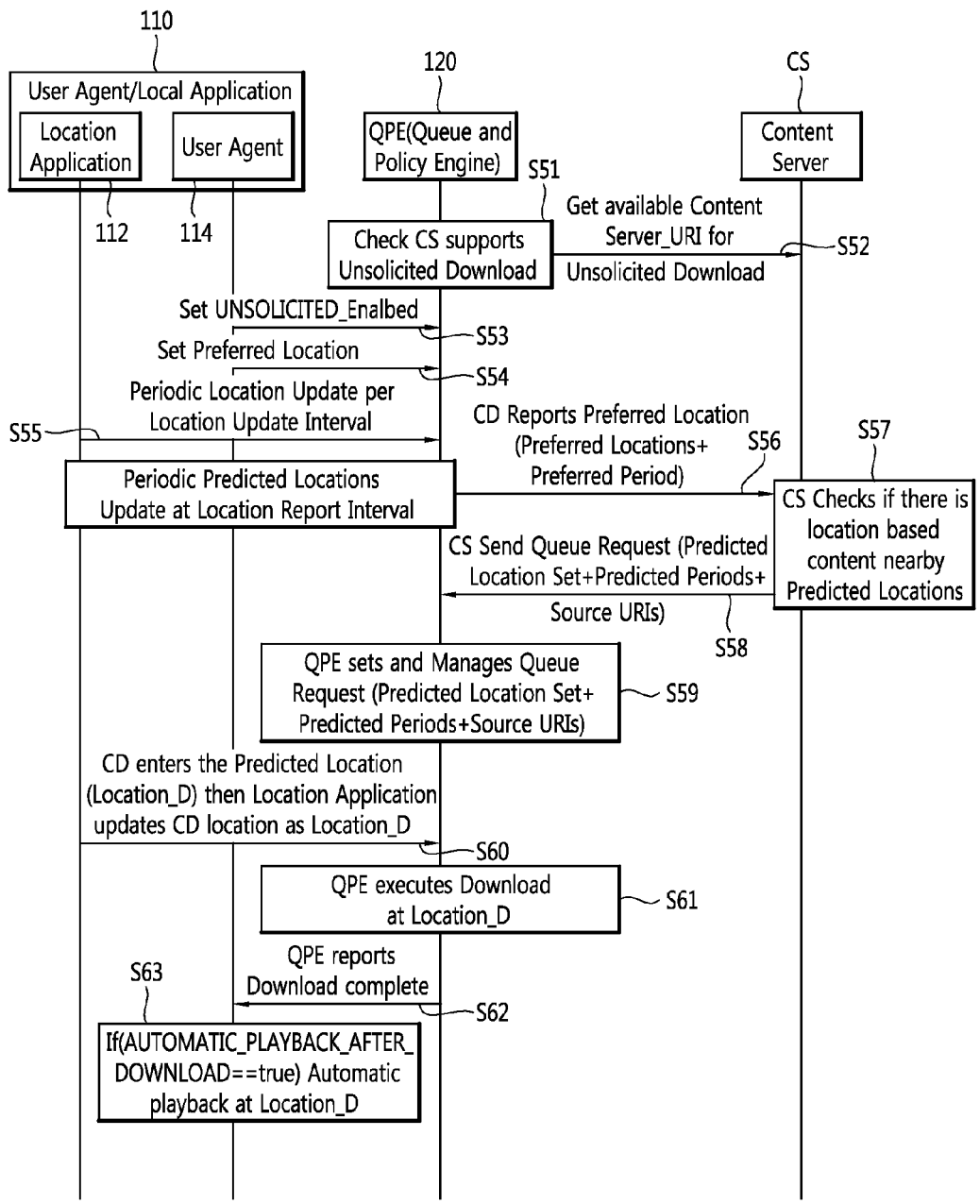
FIG. 10 is a flowchart illustrating a flow of an unsolicited location-based downloading method in accordance with further yet another embodiment of the present invention, and illustrates an unsolicited downloading procedure based on a preferred location and preferred period preferred by a user.

FIG. 10 is a flowchart illustrating a flow of an unsolicited location-based downloading method in accordance with further yet another embodiment of the present invention, and illustrates an unsolicited downloading procedure based on a preferred location and preferred period preferred by a user. In the embodiment illustrated in FIG. 10, it is assumed that the location D is a preferred location designated by the user and the CD moves from the location A to the location D.

As illustrated in FIG. 10, first, the QPE 120 of the CD may check whether or not a CS supports unsolicited downloading (step: S51). If the CS supports the unsolicited downloading, the QPE 120 may request a CS URI that will be used to send a predicted location report from the CS, and may obtain the CS URI from the CS (step: S52).

Next, the user agent 114 of the CD may enable the unsolicited downloading (step: S53). For example, the user agent 114 may set the property "Unsolicited_Enabled", managed by the QPE 120, as a true value based on the user interface illustrated in FIG. 6.

When the unsolicited downloading is activated, the user agent 114 may set preferred location information (step: S54). The preferred location information may include a preferred location and a preferred period.

The preferred location may be indicative of the location of the CD where a user is permitted to use content through unsolicited downloading. The preferred period may be indicative of a period in which a user is permitted to use content through unsolicited downloading. That is, the preferred location and the preferred period may be information indicative that a user is permitted to download content through unsolicited downloading at any place during which period.

Figure 11:
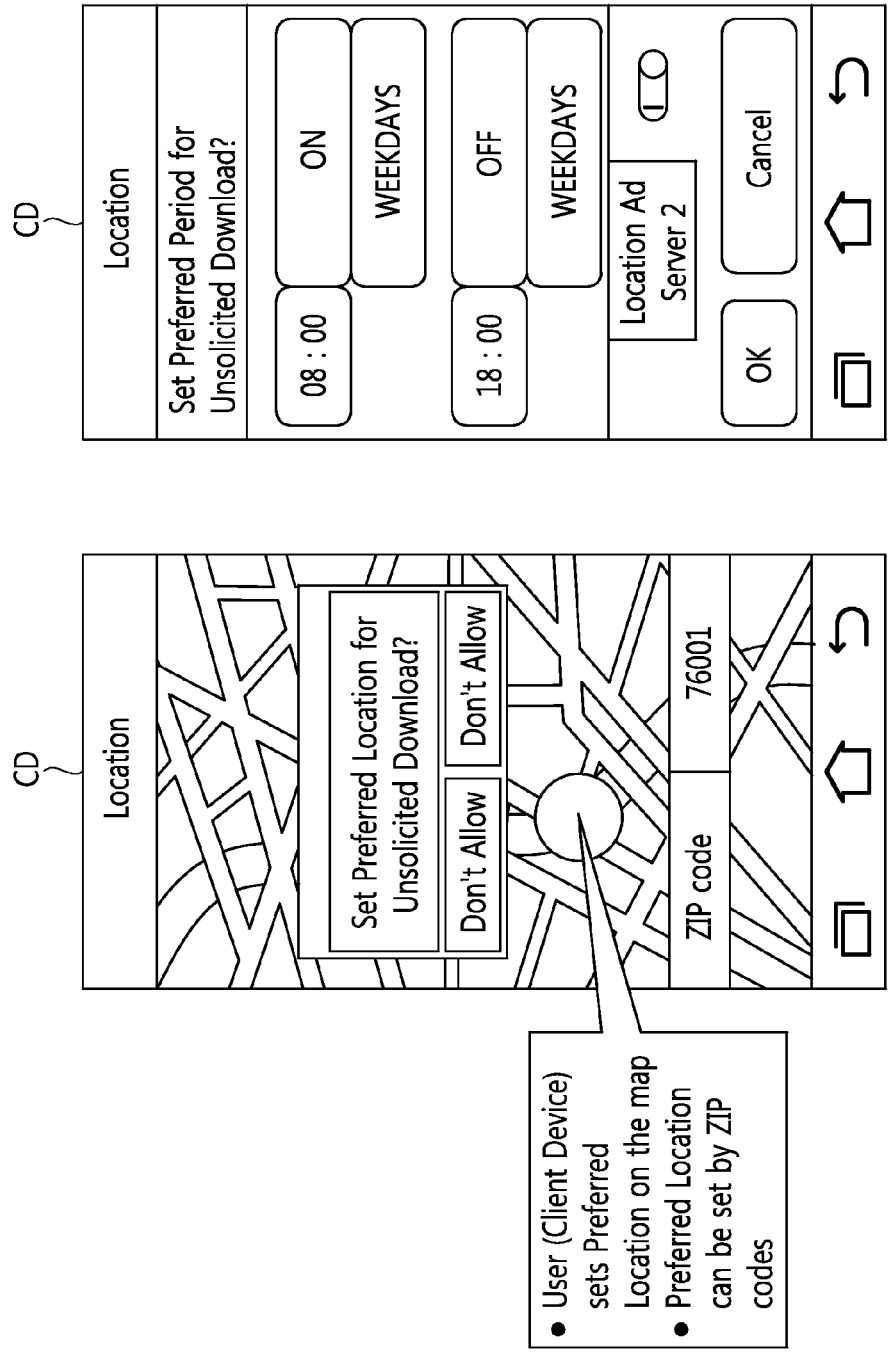
FIG. 11 illustrates a user interface in which preferred location information is set.

FIG. 11 illustrates a user interface in which preferred location information is set.

As illustrated in FIG. 11, a CD may display a map and may request a user to select a desired area on the map. When the user selects a desired area, the CD may set the selected area as a preferred location in response to a selection signal. Furthermore, the CD may provide an input unit capable of selecting a preferred period, and may request the user to input a preferred period. When a specific period is input by the user, the CD may set the input period as a preferred period in response to a corresponding input signal.

For example, assuming that a user wants to perform unsolicited downloading on unspecified data required for business in an office, that is, at the location D, during office hours, that is, from a.m. 8 to 18:00 hours, each weekday, the CD may set the location D as a preferred location and set a.m. 8 to 18:00 hours on weekdays as a preferred period, based on the user interface illustrated in FIG. 11.

The preferred location may be represented as a property "PreferredLocation", and the preferred period may be represented as a property "PreferredPeriod".

The "PreferredLocation" may mean a location where a CD allows the location-based prediction downloading of content. The PreferredLocation" may be the geographical of the CD during the time period "PreferredPeriod", that is, during the preferred period.

The preferred location may be represented as a combination of the latitude and the longitude. Information about the latitude and the longitude may be, for example, a "DDD:MM:SS.SSSS, DDD:MM:SS.SSS" form. In this case, D is an angle, M is a minute of an arc (i.e., an angle of 1/60 of 1 degree), and S is a second of the arc (i.e., an angle of 1/3600 of 1 degree). The latitude and the longitude are comma-delimited. The "PreferredLocation" may be set by the CD and may be set by ZIP code. Meanwhile, the predicted location may be represented using information used to identify the location of the device in wireless communication, for example, a Service Set ID (SSID) of Wi-Fi, and may be represented using a cell ID of a Third Generation Partnership Project (3GPP) or Long Term Evolution (LTE) network.

The "PreferredPeriod" represents a predicted time period during which the CD would be at the preferred location, and is generated the CD.

Meanwhile, after the location update interval is set, the local application 112 may update location information at the set update interval (step: S55). The queue/policy engine 120 may report the updated information to the CS (step: S56).

For example, the local application 112 may predict that the CD will be placed when and where in the future based on a device location prediction algorithm included in the CD or an external device that operates in conjunction with the CD, may update location information based on such prediction, and may report the updated location information to the CS.

In this case, the set preferred location and the set preferred period are pieces of information set by the CD based on the user's intention, and thus may be said to be prediction information having the highest reliability. The QPE 120 may report updated location information, including the set preferred location and the set preferred period, to the CS as the predicted location information of the CD, or may report updated location information obtained by mapping a location and period, corresponding to the set preferred location and preferred period, to a predicted location having the highest location priority and a predicted period, to the CS.

The CS may check whether or not content corresponding to the location information received from the QPE 120 is present (step: S57), and may select the source URI of a source capable of providing the corresponding content. In selecting the source URI, various factors, such as the contents (e.g., area information, and advertising, tourism information, predetermined content, etc. related to the area) of the content, a transmission bandwidth, a network state, network resources, and the profile of the content, may be taken into consideration according to predetermined criteria.

Next, the CS may generate a queue request and send the queue request to the QPE 120 (step: S58). The queue request requests that the content be downloaded from the source to the CD when the CD enters the predicted location in the predicted period. The predicted location and the predicted period may be a preferred location and a preferred period.

The QPE 120 that has received the queue request from the CS may set and manage the received queue request (step: S59). When the CD enters the permitted location D, the local application 112 may update the current location of the CD based on the location D (step: S60). The QPE 120 may perform the downloading of the content at the location D using the queue request received from the CS (step: S61).

When the downloading of the content is completed, the QPE 120 reports that the downloading has been completed to the user agent 114 (step: S62). In response thereto, the user agent 114 may play back the content (step: S63). For example, if the property "AUTOMATIC_PLAYBACK_AFTER_DOWNLOAD" is true, the downloaded content is automatically played back by the CD.

Meanwhile, yet another preferred embodiment of the present invention may include an embodiment in which the subject that generates the queue request in the embodiment described with reference to FIG. 10 is changed into the QPE 120 of the CD as in the embodiment described with reference to FIG. 9.

Figure 12:
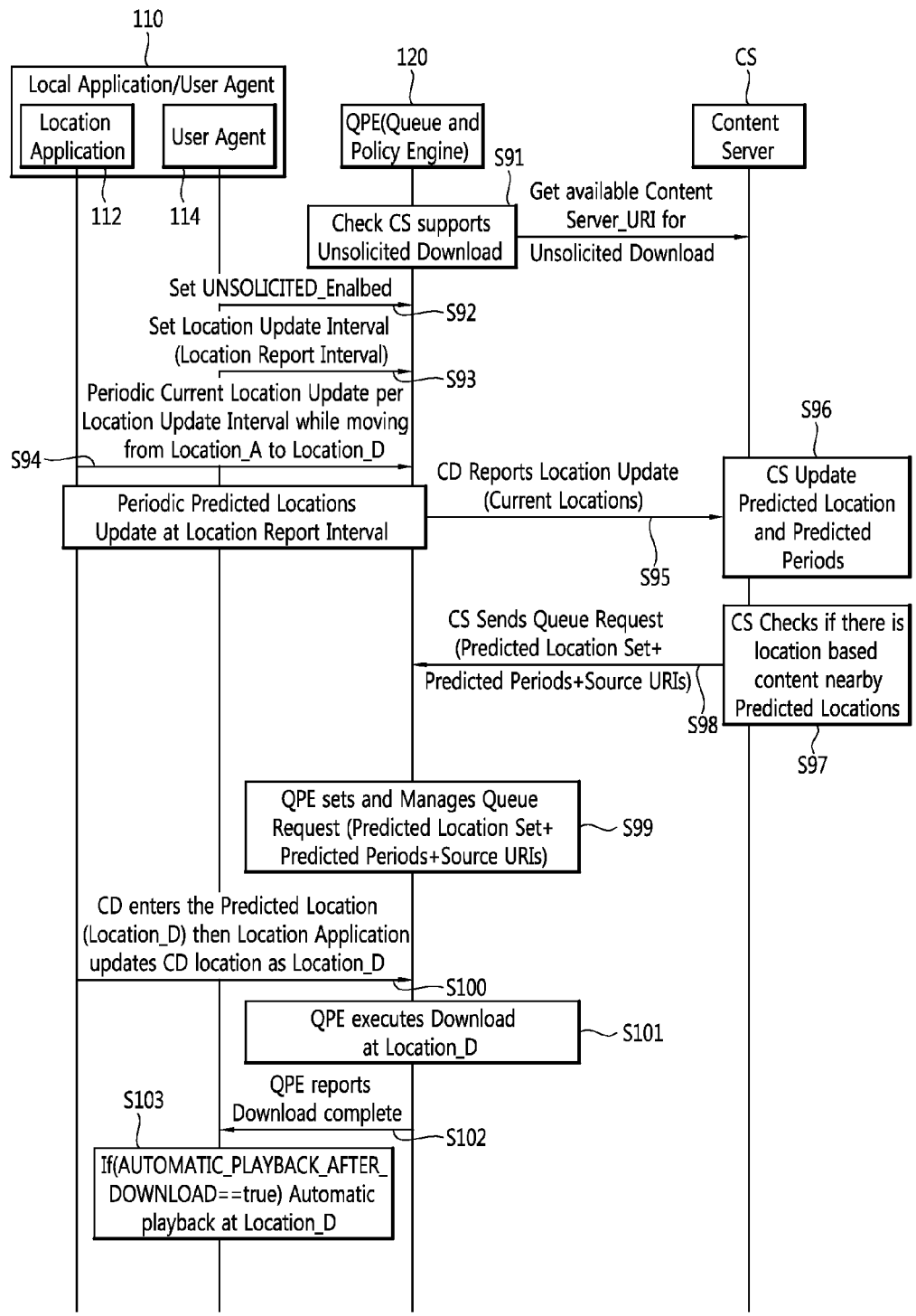
FIG. 12 is a flowchart illustrating a flow of an unsolicited location-based downloading method in yet another embodiment of the present invention, and illustrates an example in which the prediction of a location is predicted on the content server side.

FIG. 12 is a flowchart illustrating a flow of an unsolicited location-based downloading method in still yet another embodiment of the present invention. In the embodiment illustrated in FIG. 12, it is assumed that a CD move from a location A to a location D.

As illustrated in FIG. 12, first, the QPE 120 of the CD may check whether or not a CS supports unsolicited downloading (step: S91). If the CS supports the unsolicited downloading, the QPE 120 may request a CS URI that will be used to send a predicted location report from the CS, and may obtain the CS URI from the CS.

Next, the user agent 114 of the CD may enable the unsolicited downloading (step: S92). For example, the user agent 114 may set the property "Unsolicited_Enabled", managed by the QPE 120, as a true value based on the user interface illustrated in FIG. 6.

When the unsolicited downloading is activated, the user agent 114 may set a location update interval (step: S93). For example, the user agent 114 may set "LocationUpdateInterval", managed by the QPE 120, based on the user interface illustrated in FIG. 7.

Thereafter, while the CD moves from the location A to the location D, the local application 112 of the CD may periodically update information about the location of the CD at a set location update interval (step: S94).

In the present embodiment, the location information may include the current location and movement time of the CD, etc. Next, the QPE 120 may report the updated location information to a CS (step: S95). The reported location information may include the current location and movement time of the CD, and so on.

The current location of the CD may be represented as a combination of the latitude and the longitude. Information about the latitude and the longitude may be, for example, a "DDD:MM:SS.SSSS, DDD:MM:SS.SSS" form. In this case, D is an angle, M is a minute of an arc (i.e., an angle of 1/60 of 1 degree), and S is a second of the arc (i.e., an angle of 1/3600 of 1 degree). The latitude and the longitude are comma-delimited.

Alternatively, the location of the CD may be represented using information used to identify the location of the device in wireless communication, for example, a Service Set ID (SSID) of Wi-Fi, and may be represented using a cell ID of a Third Generation Partnership Project (3GPP) or Long Term Evolution (LTE) network.

The CS that has received the location information of the CD from the QPE 120 may predict that the CD will be placed when and where in the future using a device location prediction algorithm included in the CS or an external device that operates in conjunction with the CD. For such prediction, the CS may convert the format of the information, received from the QPE 120, into a format used in the CS. For example, if the format of the information received from the QPE 120 is represented as an SSID of Wi-Fi, the CS may convert the format of the received information into a latitude/longitude format.

The CS may update the predicted location and predicted period of the CD based on the device location prediction algorithm (step: S96). For example, the location information updated by the CS may include the properties "PredictedLocation" and "PredictedPeriod".

The predicted location may include geographical information about the location D, and the predicted period may include time period information indicative of a period in which the CD stays at the location D. The location information updated by the CS may include the priority of a location, that is, "Location_PRIORITY".

The CS may check whether or not content corresponding to the predicted location is present (step: S97), and may select the source URI of a source capable of providing the corresponding content. In selecting the source URI, various factors, such as the contents (e.g., area information, and advertising, tourism information, predetermined content, etc. related to the area) of the content, a transmission bandwidth, a network state, network resources, and the profile of the content, may be taken into consideration according to predetermined criteria.

Next, the CS may generate a queue request and send the queue request to the QPE 120 (step: S98). The queue request requests that the content be downloaded from the source to the CD when the CD enters the predicted location in the predicted period.

The queue request may include the predicted location, the predicted period, the source URI, and so on. For example, the queue request may include the properties "PredictedLocation", "PredictedPeriod", and "Source_URI". If a plurality of predicted locations, predicted periods, and source URIs are present, the CD may generate a plurality of queue requests corresponding to the plurality of "predicted locations—predicted periods—source URIs", and may send the plurality of queue requests to the QPE 120 of the CD.

The QPE 120 that has received the queue request from the CS may set and manage the received queue request (step: S99). When the CD enters the predicted location, for example, the location D, the local application 112 may update the current location of the CD based on the location D (step: S100). The QPE 120 may perform the downloading of the content at the location D based on the queue request received from the CS (step: S101).

When the downloading of the content is completed, the QPE 120 reports that the downloading has been completed to the user agent 114 (step: S102). In response thereto, the user agent 114 may play back the content (step: S103). If the property "AUTOMATIC_PLAYBACK_AFTER_DOWNLOAD" is true, the downloaded content is automatically played back by the CD.

Meanwhile, further yet another preferred embodiment of the present invention may include an embodiment in which the subject that generates the queue request in the embodiment described with reference to FIG. 12 is changed into the QPE 120 of the CD as in the embodiment described with reference to FIG. 9. In such a case, the CS may send the predicted location, the predicted period, and the source URI to the CD, and the CD may generate the queue request based on the received information.

Figure 13:
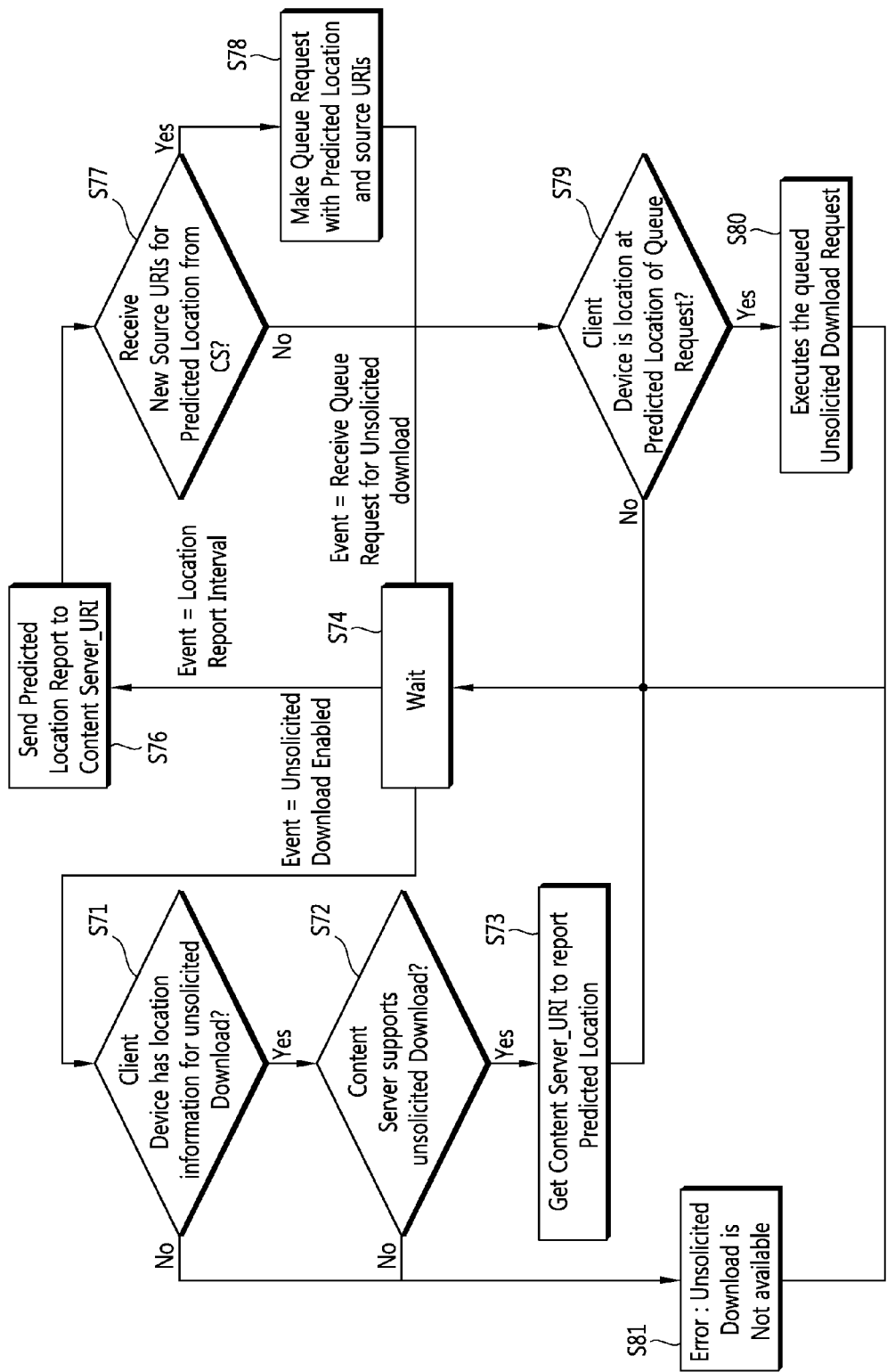
FIG. 13 is a flowchart illustrating procedures performed by a client device for unsolicited downloading in accordance with yet another embodiment of the present invention.

FIG. 13 is a flowchart illustrating procedures performed by a CD for unsolicited downloading in accordance with yet another embodiment of the present invention.

As illustrated in FIG. 13, when unsolicited downloading is enabled in a wait state (step: S74), the CD checks whether or not it has location information for the unsolicited downloading (step: S71). In this case, if it is determined that the CD does not have the location information for the unsolicited downloading, the CD may generate an error and output a corresponding message, for example, "Unsolicited Download is Not Available" (step: S81).

If the CD has the location information for the unsolicited downloading, the CD determines whether or not a CS supports the unsolicited downloading (step: S72). In this case, if it is determined that the CS does not support the unsolicited downloading, the CD may shift to the error generation step (step: S81).

If it is determined that the CS supports the unsolicited downloading, the CD may obtain the URI of the CS (step: S73). For example, the CD may obtain the CS URI that will be used to send the predicted location report of the CD from the CS. The predicted location report may be information about the location of the CD, including a predicted location, a predicted period, and so on.

Next, the CD may shift to the wait step (step: S74). If a point of time corresponding to a set location report interval is reached in the wait step (step: S74), the CD may send the predicted location report to the CS URI (step: S76). For example, the CD may predict the near future location of the CD, may update a predicted location and a predicted period, and may send the predicted location report including the pieces of updated information to the CS URI.

Thereafter, the CD may receive a source URI, corresponding to the predicted location and the predicted period, from the CS (step: S77). Thereafter, the CD may generate a queue request, including the received source URI, the predicted location, the predicted period, and so on (step: S78). If the source URI is included in the queue request generated by the CS and is received at step S77, step S78 may be omitted.

Thereafter, the CD may determine whether or not it is placed at the predicted location of the queue request (step: S79). If it is determined that the CD is placed at the predicted location, the CD may perform the unsolicited downloading using the queue request (step: S80).

Although the preferred embodiments of the present invention have been illustrated above, those skilled in the art will appreciate that the present invention may be modified in various ways without departing from the technological details and scope of the present invention defined in the appended claims. Accordingly, the future changes of the embodiments of the present invention will not depart from the technology of the present invention.

What is claimed is:

1. A method for unsolicited location-based downloading, the method comprising:
    setting a location report interval for updating information about a location of a client device;
    updating the location information of the client device based on the location report interval;
    reporting the updated location information to a server;
    receiving a predicted location and predicted period of the client device and a source universal resource identifier (URI) for downloading content from the server before the client device reaches the predicted location;
    sending a request for the content to a source corresponding to the source URI when the client device reaches the predicted location, wherein the request is for requesting downloading of the content in a set format and is generated by any one of the server and the client device;
    downloading the content from the source in response to the request, wherein the predicted location is plural; and
    assigning a priority to each of the predicted locations according to predetermined criteria.

2. The method of claim 1, wherein the location information of the client device comprises the predicted location and predicted period of the client device.

3. The method of claim 1, further comprising steps of:
    determining whether or not the server supports unsolicited downloading; and
    obtaining a server URI for the unsolicited downloading based on the determination.

4. The method of claim 1, further comprising steps of:
    displaying a user interface that requests unsolicited downloading to be activated; and
    enabling the unsolicited downloading in response to a request signal received through the user interface.

5. The method of claim 1, wherein the updating the location information of the client device comprises periodically updating the predicted location and predicted period of the client device at the location update interval using a device location prediction algorithm.

6. The method of claim 1, wherein the receiving a predicted location and predicted period of the client device and a source URI for downloading content from the server comprises receiving a queue request, comprising the predicted location, the predicted period, and the source URI from the server.

7. The method of claim 1, wherein:
    receiving a predicted location and predicted period of the client device and a source URI for downloading content from the server comprises receiving a message, comprising the predicted location, the predicted period, and the source URI, from the server, and
    the unsolicited downloading method further comprises generating a queue request comprising the predicted location, the predicted period, and the source URI.

8. The method of claim 1, wherein the reporting the updated location information comprises sending a current location of the client device to the server based on a predetermined location report interval.

9. The method of claim 1, further comprising:
    displaying a user interface capable of designating the preferred location and the preferred period; and
    setting the preferred location and the preferred period in response to a signal received from the user interface,
    wherein highest priority is assigned to the preferred location and the preferred period in the location information.

10. The method of claim 5, wherein the device location prediction algorithm comprises at least one of:
    a first prediction algorithm for predicting a future location of the client device based on a current movement direction and movement speed of the client device;
    a second prediction algorithm for predicting a future location of the client device based on a movement history of the client device during a set period; and a third prediction algorithm for predicting a future location of the client device using a preferred location and preferred period received from a user.

11. The method of claim 5, wherein the reporting the updated location information comprises sending a message, comprising the updated predicted location and predicted period of the client device, to the server.

12. An apparatus for unsolicited location-based downloading, the apparatus comprising:
a first unit configured to:
set a location report interval for updating information about a location of a client device, and
update the location information of the client device based on the location report interval; and
a second unit configured to:
report the updated location information to a server,
receive a predicted location and predicted period of the client device and a source universal resource identifier (URI) for downloading content from the server before the client device reaches the predicted location,
send a request for the content to a source corresponding to the source URI when the client device reaches the predicted location, wherein the request is for requesting downloading of the content in a set format and is generated by any one of the server and the client device, and
download the content from the source in response to the request, wherein the predicted location is plural,
the first unit further configured to assign a priority to each of the predicted locations according to predetermined criteria.

13. The apparatus of claim 12, wherein the second unit determines whether or not the server supports unsolicited downloading and obtains the server URI for the unsolicited downloading from the server based on the determination.

14. The apparatus of claim 12, wherein the first unit displays a user interface that requests unsolicited downloading to be activated and enables the unsolicited downloading in response to a request signal received through the user interface.

15. The apparatus of claim 12, wherein the first unit periodically updates a predicted location and predicted period of the client device at the location update interval using a device location prediction algorithm.

16. The apparatus of claim 12, wherein the second unit manages a queue request comprising the predicted location, the predicted period, and the source URI when the queue request is received from the server and generates a queue request based on the predicted location, the predicted period, and the source URI when the predicted location, the predicted period, and the source URI are received from the server.

17. The apparatus of claim 15, wherein the second unit sends a message, comprising the updated predicted location and predicted period of the client device, to the server.

18. A system for unsolicited location-based downloading, the system comprising:
a client device and a content server capable of interoperating with each other, the client device configured to:
set a location report interval for updating information about a location of the client device,
update the location information of the client device based on the location report interval,
report the updated location information to the content server,
receive a predicted location and predicted period of the client device and a source universal resource identifier (URI) for downloading content from the content server before the client device reaches the predicted location,
send a request for the content to a source corresponding to the source URI when the client device reaches the predicted location, wherein the request is for requesting downloading of the content in a set format and is generated by any one of the server and the client device,
download the content from the source in response to the request, wherein the predicted location is plural, and
assign a priority to each of the predicted locations according to predetermined criteria.

* * * * *